(12) United States Patent
Rubinstain et al.

(10) Patent No.: US 7,697,507 B2
(45) Date of Patent: *Apr. 13, 2010

(54) ETHERNET TRANSPORT OVER A TELEPHONE LINE

(75) Inventors: Avinoam Rubinstain, Macabim (IL); Yackov Sfadya, Kfar-Saba (IL); Shimon Peleg, Hod Hasharon (IL); Noam Alroy, Kadima (IL); Amnon Harpak, Holon (IL); Boaz Porat, Haifa (IL)

(73) Assignee: Infineon Technologies AG, Munich (DE)

(*) Notice: Subject to any disclaimer, the term of this patent is extended or adjusted under 35 U.S.C. 154(b) by 1548 days.

This patent is subject to a terminal disclaimer.

(21) Appl. No.: 10/797,937

(22) Filed: Mar. 11, 2004
(Under 37 CFR 1.47)

(65) Prior Publication Data
US 2005/0047497 A1 Mar. 3, 2005

Related U.S. Application Data

(63) Continuation-in-part of application No. 09/322,062, filed on May 27, 1999, now Pat. No. 7,054,376.

(51) Int. Cl.
*H04L 12/66* (2006.01)
*H04L 5/16* (2006.01)

(52) U.S. Cl. ............... 370/352; 375/222; 375/261; 375/257; 375/258; 709/250; 370/468

(58) Field of Classification Search ............ 370/352, 370/258, 404, 468, 469; 375/261, 257, 258, 375/222; 709/250
See application file for complete search history.

(56) References Cited

U.S. PATENT DOCUMENTS

| 5,410,343 | A | | 4/1995 | Coddington et al. ............ 348/7 |
| 5,541,957 | A | * | 7/1996 | Lau ............................. 375/258 |
| 5,754,540 | A | * | 5/1998 | Liu et al. ..................... 370/315 |
| 5,784,683 | A | | 7/1998 | Sistanizadeh et al. ....... 370/487 |

(Continued)

OTHER PUBLICATIONS

Electronic News, Infineon, 3Com Patent Ethernet -over-DSL_Company Business and Marketing, Jan. 15, 2001, Cahners Publising Company, p. 5 of 7.*

(Continued)

*Primary Examiner*—Ahmad F Matar
*Assistant Examiner*—Antim Shah
(74) *Attorney, Agent, or Firm*—Eschweiler & Associates, LLC

(57) ABSTRACT

A modem for symmetric bi-directional transporting of an Ethernet signal, comprises a port connected to a physical layer module adapted to receive and transmit a single Ethernet signal, a data splitter for splitting the Ethernet signal into the configurable number of downstream data signals, and another portion comprising the configurable number of Digital Subscriber Line (DSL) ports coupled to the data splitter. Each port is adapted to transmit a separate downstream signal. Each transmitted downstream signal is transmitted via a corresponding telephone line connected to the port. Each port is further adapted to receive a separate upstream signal. Each received upstream signal is received over the corresponding telephone line connected to the Digital Subscriber Line (DSL) port, and a data collection and reorganization unit coupled to the Digital Subscriber Line (DSL) ports is adapted to assemble the upstream signals into the single Ethernet signal for transmission by the physical layer module.

19 Claims, 13 Drawing Sheets

U.S. PATENT DOCUMENTS

| | | | |
|---|---|---|---|
| 5,790,548 A | 8/1998 | Sistanizadeh et al. | 370/401 |
| 5,812,786 A | 9/1998 | Seazholtz et al. | 395/200.63 |
| 5,892,768 A * | 4/1999 | Jeng | 370/445 |
| 5,896,417 A * | 4/1999 | Lau | 375/258 |
| 6,002,671 A * | 12/1999 | Kahkoska et al. | 370/248 |
| 6,055,268 A * | 4/2000 | Timm et al. | 375/229 |
| 6,065,073 A * | 5/2000 | Booth | 710/46 |
| 6,088,368 A * | 7/2000 | Rubinstain et al. | 370/480 |
| 6,101,182 A * | 8/2000 | Sistanizadeh et al. | 370/352 |
| 6,115,755 A * | 9/2000 | Krishan | 709/250 |
| 6,272,552 B1 * | 8/2001 | Melvin et al. | 709/250 |
| 6,332,004 B1 * | 12/2001 | Chan | 375/257 |
| 6,353,619 B1 * | 3/2002 | Banas et al. | 370/463 |
| 6,404,861 B1 * | 6/2002 | Cohen et al. | 379/93.01 |
| 6,452,925 B1 * | 9/2002 | Sistanizadeh et al. | 370/352 |
| 6,587,476 B1 * | 7/2003 | Lewin et al. | 370/467 |
| 6,680,940 B1 * | 1/2004 | Lewin et al. | 370/389 |
| 6,829,252 B1 * | 12/2004 | Lewin et al. | 370/493 |
| 6,963,575 B1 * | 11/2005 | Sistanizadeh et al. | 370/404 |
| 2001/0033583 A1 * | 10/2001 | Rabenko et al. | 370/503 |

OTHER PUBLICATIONS

Val Oliva, Ethernet—The Next Generation WAN Transport Technology, May 2002, pp. 1-10.*

* cited by examiner

| DSL - Port Number | $DR_{maxi}$ (Mbps) |
|---|---|
| DSL - 1 | 25 |
| DSL - 2 | 25 |
| DSL - 3 | Not Installed |
| DSL - 4 | 10 |

$N_{max} = 4$
$N_{port} = 3$

FIGURE 12a

| DSL - Port Number | $DR_{maxi}$ (Mbps) |
|---|---|
| DSL - 1 | 25 |
| DSL - 2 | 25 |
| DSL - 3 | 25 |
| DSL - 4 | 25 |

$N_{max} = 4$
$N_{port} = 4$

FIGURE 12b

ETHERNET TRANSPORT OVER A TELEPHONE LINE

CROSS REFERENCE TO RELATED APPLICATION

This application is a continuation in part of U.S. patent application Ser. No. 09/322,062 filed May 27, 1999 now U.S. Pat. No. 7,054,376.

FIELD OF THE INVENTION

The invention relates generally to a modem for symmetric bi-directional transporting of an Ethernet signal over a configurable number (N) of parallel telephone lines.

BACKGROUND OF THE INVENTION

There is a growing need among both individuals and enterprises for access to a commonly available, cost effective network that provides speedy, reliable services. There is high demand for a high-speed data network, one with enough bandwidth to enable complex two-way communications. Such an application is possible today if, for example, access is available to a university or a corporation with sufficient finances to build this type of network. But for the average home computer user or small business, access to high speed data networks is expensive or simply impossible. Telephone companies are therefore eager to deliver broadband services to meet this current explosion in demand.

One of the problem is that millions of personal computers have found their place in the home market. Today, PCs can be found in approximately 43% of all United States households and a full 50% of United States teenagers own computers. Virtually every PC sold today is equipped with a modem, enabling communication with the outside world via commercial data networks and the Internet. Currently, people use their PCs to send and receive e-mail, to access online services, to participate in electronic commerce and to browse the Internet. The popularity of the Internet is such that there are an estimated 50 million users around the globe. These figures indicate that in the past few years the personal computer has fueled a dramatic increase in data communications and the corresponding demands on the data networks that carry the traffic.

The Internet serves as a good example of the increased demands that have been placed on data networks. At first, Internet access consisted of text only data transfers. Recently, with the popularity of the World Wide Web (WWW) and the construction of numerous sites with high quality content, coupled with the development of Internet browsers such as Mosaic, Netscape Navigator and Microsoft Explorer, the use of graphics, audio, video and text has surged on the Internet. While graphics, audio and video make for a much more interesting way to view information as opposed to plain text, bandwidth consumption is significantly more. A simple background picture with accompanying text requires approximately 10 times the bandwidth needed by text alone. Real-time and audio and streaming video typically need even more bandwidth. Because of the increased requirement for bandwidth, activities such as browsing home pages or downloading graphics, audio and video files can take a frustratingly long period of time. Considering that the multimedia rich World Wide Web accounts for more than one quarter of all Internet traffic, it is easy to see why the demand for bandwidth has outpaced the supply. In addition the creative community is pushing the envelope by offering audio and full motion video on numerous sites to differentiate themselves from the millions of other sites competing for maximum user hits.

As use of the Internet and online services continues to spread, so does the use of more complex applications, such as interactive video games, telecommuting, business to business communications and video conferencing. These complex applications place severe strains on data networks because of the intensive bandwidth required to deliver data-rich transmissions. For example, a telecommuter who requires computer aided design (CAD) software to be transported over the data network requires a high-bandwidth data pipeline because of the significant size of CAD files. Similarly, a business to business transaction in which large database files containing thousand of customer records are exchanged also consumes large amounts of bandwidth. The same is true for users seeking entertainment value from sites offering high quality video and audio. The lack of available bandwidth in today's data networks is the primary barrier preventing many applications from entering mainstream use. Just as processing power limited the effectiveness of early PCs, bandwidth constraints currently limit the capabilities of today's modem user.

Most computer modem users access data through the standard telephone network, known as plain old telephone service (POTS). Equipped with today's speediest modems, dial up modems on a POTS network can access data at a rate of 28.8, 33.6 or 56 Kbps. Dial up modem transmissions rates have increased significantly over the last few years, but POTS throughput is ultimately limited to 64 Kbps. While this rate may be acceptable for some limited applications like e-mail, it is a serious bottleneck for more complex transactions, such as telecommuting, videoconferencing or full-motion video viewing. To illustrate, full motion video compressed, using the Motion Picture Entertainment Group (MPEG)-standard requires a data stream of approximately 6 Mbps, or roughly 208 times the throughput of a 28.8 Kbps modem. Thus, using today's dial up modems, it would take more than 17 days to capture two hours of video. As bandwidth demands continue to grow, providers search for better ways to offer high speed data access. Further complicating the problem is the need to deliver all these complex services at an affordable price.

Today's most popular data access method is POTS. But as discussed previously, POTS is limited when it comes to large data transfers. An alternative to POTS currently available is Integrated Services Digital Network (ISDN). In the past few years, ISDN has gained momentum as a high-speed option to POTS. ISDN expands data throughput to 64 or 128 Kbps, both from the network to the home and from the home back to the network, and can be technically made available throughout much of the United States and in many other parts of the globe. Similar to POTS, ISDN is a dedicated service, meaning that the user has sole access to the line preventing other ISDN users from sharing the same bandwidth. ISDN is considered an affordable alternative, and in general, ISDN is much better solution for applications such as Web browsing and basic telecommuting. However, like POTS, it severely limits applications such as telecommuting with CAD files and full-motion video viewing. The latter requires roughly 39 times the throughput than, that provided by ISDN. Multichannel multipoint distribution service (MMDS), a terrestrial microwave wireless delivery system, and direct broadcast satellite (DBS), such as DirecTv and US Satellite Broadcasting (USSB), are wireless networks. The both deliver high bandwidth data steams to the home, referred to as downstream data, but neither has a return channel through which data is sent back over the network, referred to as upstream data. Although it is a relatively affordable system to deploy for broadcast applications, because it requires no cable wires to be laid, it falls short in interactive access. In order to use a wireless system for something as basic as e-mail, an alternate technology such as a telephone line must be used for the upstream communications.

Another network delivery system is asymmetric digital subscriber line (ADSL). Offering a downstream capacity of 6 Mbps or more to the home, ADSL has the downstream capacity to handle the most complex data transfers, such as full motion video, as well as an upstream capacity of at least 500 Kbps. However, due to its limitation of downstream bandwidth capacity, it essentially is a single service platform. Also, since it has to overcome the challenge of reusing several thousand feet of twisted pair wiring, the electronics required at each end of the cable are complex, and therefore currently very expensive.

Hybrid fiber coax (HFC), a network solution offered by telephone and cable companies, is yet another option for delivering high bandwidth to consumers known in the art. However, HFC has limitations. HFC networks provide a downstream capacity of approximately 30 Mbps, which can be shared by up to 500 users. Upstream bandwidth is approximately 5 Mbps and also is shared. A disadvantage with HFC is that shared bandwidth and limited upstream capacity become serious bottlenecks when hundreds of users are sending and receiving data on the network, with service increasingly impaired as each user tries to access the network.

It is a current trend among telephone companies around the world to include existing twisted pair copper loops in their next generation broadband access networks. Hybrid Fiber Coax (HFC), a shared access medium well suited to analog and digital broadcast, comes up short when utilized to carry voice telephony, interactive video and high speed data communications at the same time.

Fiber to the home (FTTH) is still prohibitively expensive in the marketplace that is soon to be driven by competition rather than costs. An alternative is a combination of fiber cables feeding neighborhood Optical Network Units (ONUs) and last leg premises connections by existing or new copper. This topology, which can be called fiber to the neighborhood (FTTN), encompasses fiber to the curb (FTTC) with short drops and fiber to the basement (FTTB), serving tall buildings with vertical drops.

One of the enabling technologies for FTTN is very high rate digital subscriber line (VDSL). VDSL is an emerging standard that is currently undergoing discussion in ANSI and ETSI committees. The system transmits high speed data over short reaches of twisted pair copper telephone lines, with a range of speeds depending upon actual line length.

SUMMARY OF THE INVENTION

The present invention provides a modem and a facility transport system for transporting Ethernet over digital subscriber lines. The system is referred to as 100BaseS and is capable of transmitting at least 100 Mbps Ethernet over existing copper infrastructure up to distances of approximately 400 meters. The system of the present invention can achieve payload bit rates from 25 to 100 Mbps in increments of 25 Mbps. A bit rate of 25 Mbps is achieved using only a single copper wire pair. Each increment of 25 Mbps utilizes an additional copper pair. Note that each pair used provides a bi-directional 25 Mbps link, i.e., downstream and upstream. Thus, four copper wire pair connections provide 4×25 Mbps downstream channels and 4×25 Mbps upstream channels.

The system utilizes framing circuitry to adapt the 100BaseT input data signal to up to four separate output signals. A DSL Ethernet Port card couples the modem to each twisted pair used. Each DSL Ethernet Port card comprises modem transmitter and receiver circuitry for sending and receiving 100BaseS signals onto its respective twisted pair wires.

The system utilizes quadrature amplitude modulation (QAM). QAM is the most commonly used form of high-speed modulation over voice telephone lines. The system also utilizes frequency division multiplexing (FDM) to separate downstream channels from upstream channels. In addition, FDM is also used to separate both the downstream and the upstream channels from POTS and ISDN signals. A substantial distance in frequency is maintained between the lowest data channel and POTS frequencies to permit the use of very simple and cost effective POTS splitters, which are actually splitters/combiners. The upstream channel is placed above the downstream channel in frequency. The downstream and upstream data channels are separated in frequency from bands used for POTS and ISDN, enabling service providers to overlay 100BaseS on existing services.

The 100BaseS system of the present invention combines copper access transmission technology of Ethernet based services with Quality of Service (QoS) guaranteed by the SRVP protocol and is capable of being full managed through an SNMP agent. The 100BaseS transport facility can deliver symmetrical data at 28.125 Mbps (net 25 Mbps) per copper pair for a total of 112.5 Mbps (net 100 Mbps) over the unscreened, twisted pair telephone wires originally intended for bandwidths of between 300 Hz and 3.4 KHz. The invention uses QAM modulation and blind equalization to achieve a high transmission speed over existing copper infrastructure. In addition, the system is able to cope with several sources of noise such as impulse noise, e.g. POTS transients, radio frequency interference (RFI) noise and crosstalk noise, i.e., both near end crosstalk (NEXT) and far end crosstalk (FEXT). In terms of RF emissions, the system can operate using underground cabling as well as overhead distribution cabling.

The 100BaseS system has applications in the small office/home office (SOHO) market and can be installed in industrial areas or business districts where most of the copper infrastructure is of shorter distances. The small office/home office market has greatly developed in recent years and is eagerly waiting for LAN extension solutions. The need for connecting between several buildings of the same company or between headquarters to branches, dictates either using a leased line such as T1/T3 which is very expensive or a POTS/ISDN modem which is very slow. The 100BaseS system of the present in invention can be applied to these markets while achieving better price performance for both the Telephone Company and the end user.

There is provided in accordance with the present invention a point to point facility transport system for the transport of 100BaseTX Ethernet frame data over N copper wire pairs connecting a central office facility to a customer premise comprising N downstream transmission paths for transporting 100BseTX Ethernet frame data transmitted from the central office facility destined to the customer premise, N upstream transmission paths for transporting 100BaseTX Ethernet frame data transmitted from the customer premise destined to the central office facility, first modem means located at the central office facility and coupled to one end of the N downstream transmission paths and one end of the N upstream transmission paths, second modem means located at the customer premises and coupled to the other end of the N downstream transmission paths and the other end of the N upstream transmission paths, wherein the first modem means and the second modem means are operative to place onto and receive from the N copper wire pairs, data frames encapsulating the Ethernet frame data and wherein N is a positive integer in the range of one to four.

The downstream transmission path utilizes quadrature amplitude modulation (QAM) to transport the Ethernet frame data from the central office facility to the customer premise. The upstream transmission path utilizes quadrature amplitude modulation (QAM) to transport the Ethernet frame data from the customer premise to the central office facility.

The first modem means and the second modem means further includes a physical layer module for performing physical layer functions for 100BaseTX Ethernet, the physical layer module operative to communicate over a Media Independent Interface (MII) bus, a data splitter adapted to divide the MII data stream into N output data streams, each output data stream destined for a transmitter, N transmitters for coupling to the N copper wire pairs, each transmitter adapted to modulate one of the data streams output of the data splitter so as to generate a transmit signal therefrom suitable for transmission onto one of N copper wire pairs, N receivers for coupling to the N copper wire pairs, each receiver adapted to demodulate a signal received from one of the N copper sire pairs so as to generate a receive data signal therefrom, a data collector adapted to receive the N receive data signals from the N receivers and to combine and reorganize the N receive data signals into a single data steam for output via the physical layer module in a form compatible with 100BaseTX. The facility transport system further comprises an auto sense unit operative to sense the number of transmitters and receivers installed in a modem.

There is also provided in accordance with the present invention a point to point facility transport system for the transport of 100BaseTX Ethernet frame data and plain old telephone service (POTS) over N copper wire pairs connecting a central office facility to a customer premise comprising N downstream transmission paths for transporting 100BseTX Ethernet frame data and POTS transmitted from the central office facility destined to the customer premise, N upstream transmission paths for transporting 100BaseTX Ethernet frame data and POTS transmitted from the customer premise destined to the central office facility, first modem means located at the central office facility and coupled to one end of the N downstream transmission paths and one end of the N upstream transmission paths, second modem means located at the customer premises and coupled to the other end of the N downstream transmission paths and the other end of the N upstream transmission paths, first splitter means coupled to the first modem means and to the V copper wire pairs, second splitter means coupled to the second modem means and the N copper wire pairs, wherein the first modem means and the second modem means are operative to place onto and receive from the N copper wire pairs data packets encapsulating the 100BaseTX Ethernet frame data, wherein the first splitter means and the second splitter means are operative to combine and split the POTS and N downstream and N upstream transmission path signals, wherein N is a positive integer in the range of one to four.

There is further provided in accordance with the present invention a point to point facility transport system for the transport of 100BaseTX Ethernet frame data over N copper wire pairs connecting a central office facility to a customer premise comprising N downstream transmission paths for transporting 100BaseTX Ethernet frame data transmitted from the central office facility destined to the customer premise, N upstream transmission paths for transporting 100BaseTX Ethernet frame data transmitted from the customer premise destined to the central office facility and coupled to one end of the N downstream transmission paths and one end of the N upstream transmission paths, a network element located at the customer premises and coupled to the other end of the N downstream transmission paths and the other end of the N upstream transmission paths, wherein the switch means and the network element are operative to place onto and receive from the N copper wire pairs data frames encapsulating the 100BaseTX Ethernet frame data.

BRIEF DESCRIPTION OF THE DRAWINGS

The invention is herein described, by way of example only, with reference to the accompanying drawings, wherein:

FIG. 12A, 12B are tables for illustrating the functionality of the modem according to the present invention.

DETAILED DESCRIPTION OF THE PREFERRED EMBODIMENTS

Figure 1:
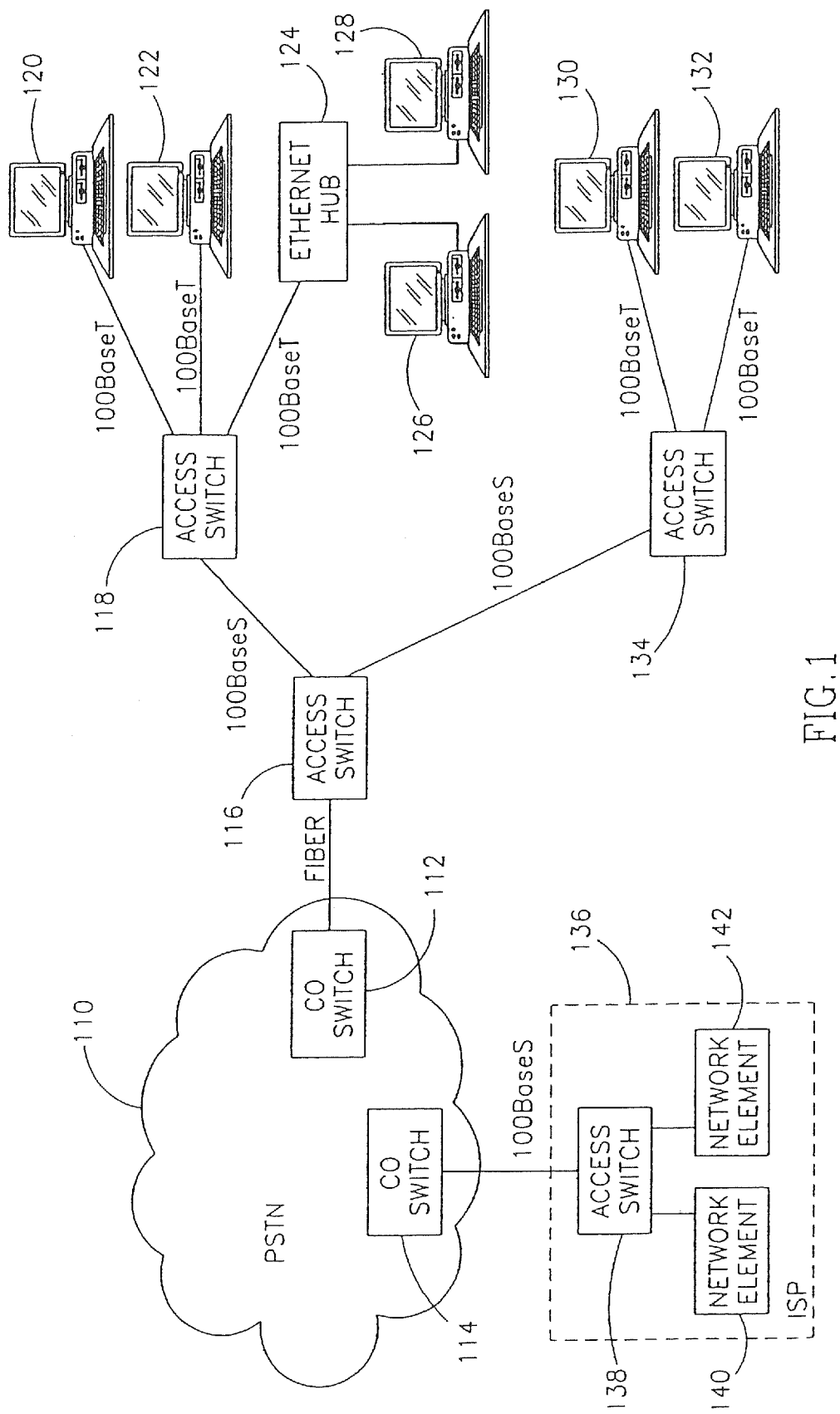
FIG. 1 is a block diagram illustrating the 100BaseS transport facility of the present invention as applied to a sample telephony application.

The present invention is a facility transport system for transporting Ethernet over digital subscriber lines. The system is referred to as 100BaseS and is capable of transmitting 100 Mbps Ethernet over existing copper infrastructure up to distances of approximately 400 meters. The system of the present invention can achieve payload bit rates from 25 to 100 Mbps in increments of 25 Mbps. A bit rate of 25 Mbps is achieved using only a single copper wire pair. Note that each pair used provides a bi-directional 25 Mbps link, i.e., downstream and upstream. Thus, for copper wire pair connections provide 4×25 Mbps downstream channels and 4×25 Mbps upstream channels.

The system utilizes quadrature amplitude modulation (QAM). QAM is the most commonly used form of high speed modulation over voice telephone lines. The system also utilizes frequency division multiplexing (FDM) to separate downstream channels from upstream channels. In addition, FDM is also used to separate both the downstream and the upstream channel from POTS or ISDN signals. A substantial distance in frequency is maintained between the lowest data channel and POTS frequencies to permit the use of very simple and cost effective POTS splitters, which are actually splitters/combiners. The upstream channel is placed above the downstream channel in frequency. The downstream and upstream data channels are separated in frequency from bands used for POTS and ISDN, enabling service providers to overlay 100BaseS on existing services.

The 100BaseS system of the present invention combines copper access transmission technology of Ethernet based services with Quality of Service (QoS) guaranteed by the SRVP protocol and is capable of being fully managed through an SNMP agent. The 100BaseS transport facility can deliver symmetrical data at 28.125 Mbps (net 25 Mbps) per copper pair for a total of 112.5 Mbps (net 100 Mbps) over the unscreened, twisted pair telephone wires originally intended for bandwidths of between 300 Hz and 3.4 KHz. The invention uses QAM modulation and blind equalization to achieve a high transmission speed over existing copper infrastructure. In addition, the system is able to cope with several sources of noise such as impulse noise, e.g., POTS transients, radio frequency interference (RFI)noise and crosstalk noise, i.e., both near end crosstalk (NEXT) and far end crosstalk (FEXT). In terms of RF emissions, the system can operate using underground cabling as well as overhead distribution cabling.

Both the LAN, i.e., Ethernet frames, and POTS services, i.e., voice, may be transmitted over a common optical access network before final distribution over a copper distribution network. Alternatively, in the case where LAN services are provided by an overlay network, an Optical Network Unit (ONU) is co-located with an existing copper network distribution point where the LAND and POTS services are combined for transmission over the existing copper distribution network.

In one installation application of the invention, 100BaseS transmission would be used on shorter exchange lines when the switch or ONU is located in a serving exchange building. The switcher or ONU may be sited in different locations forming different architecture for a hybrid optical network. Some of these architectures include: fiber to the cabinet (FTT-Cab), fiber to the curb (FTTC), fiber to the node (FTTN), fiber to the building (FTTB) and fiber to the exchange (FTTEx).

The 100BaseS transport facility of the present invention supports both LAN and POTS services sharing the same copper distribution cable. The POTS and the LAN services are separated close to the point where the combined signals enter the customer premises. This is achieved by a POTS splitter filter, i.e., splitter/combiner filter, which may or may not be part of the network termination (NT). The 100BaseS system is a point to point transmission system even though the core modem is a blind modem that is able to support point to point to multipoint communications. The network termination interface at the customer premises can be the widely used 100BaseT RJ-45 interface. The customer can hook up any common 100BaseT equipment, such as an Ethernet switch or hub, or any product that has an Ethernet network interface card (NIC). The network interface unit will respond to test and management messages originated by any SNMP network management system.

The system supports two latency modes that can be modified by software or through the network management: with an interleaver resulting in a latency of less than 20 msec; without an interleaver resulting in a latency of less than 200 msec.

A block diagram illustrating the 100BaseS transport facility of the present invention as applied to a sample telephony application is shown in FIG. 1. The public switched telephone network (PSTN) 110 is shown with one central office (CO) switch 114 coupled to Internet service provider (ISP) 136. The ISP comprises an access switch 138 that is shown coupled to two network elements 140, 142. Another central office switch 112 is shown connected by a fiber link to the access switch 116.

The access switch 116 is shown connected to two access switches 118, 134 via 100BaseS connections. It is important to note that all 100BaseS connections actually comprise from one to four twisted pair wires, depending on the number of pairs implemented. The two access switches 118, 134 represents edge devices for two separate customer premises. The access switch 118 is shown connected to computer workstations 120, 122 and to an Ethernet hub 124. The Ethernet hub, in turn, is connected to two computer workstations 126, 128. Data communications between the access switch and the computer workstations and the Ethernet hub are carried over 100BaseT links. The access switch 134 is shown coupled to computer workstations 130, 132. Communication between the computer access switch and the computer workstations occur over 100BaseT links.

It is important to note that the network comprising computer workstations and the Ethernet hub, shown connected to the access switch in the example in FIG. 1, is for illustrative purposes only. One skilled in the art can assemble numerous other configurations without departing from the spirit of the invention. The access switch of the present invention can be coupled to any device able to communicate using 100BaseT.

Each of the access switches comprises 100BaseS modems that communicate with each other using the 100BaseS modulation and protocol scheme disclosed herein. The modems, including the transmitter and receiver portions, incorporated in the access switches are described in more detail herein below.

Figure 2:
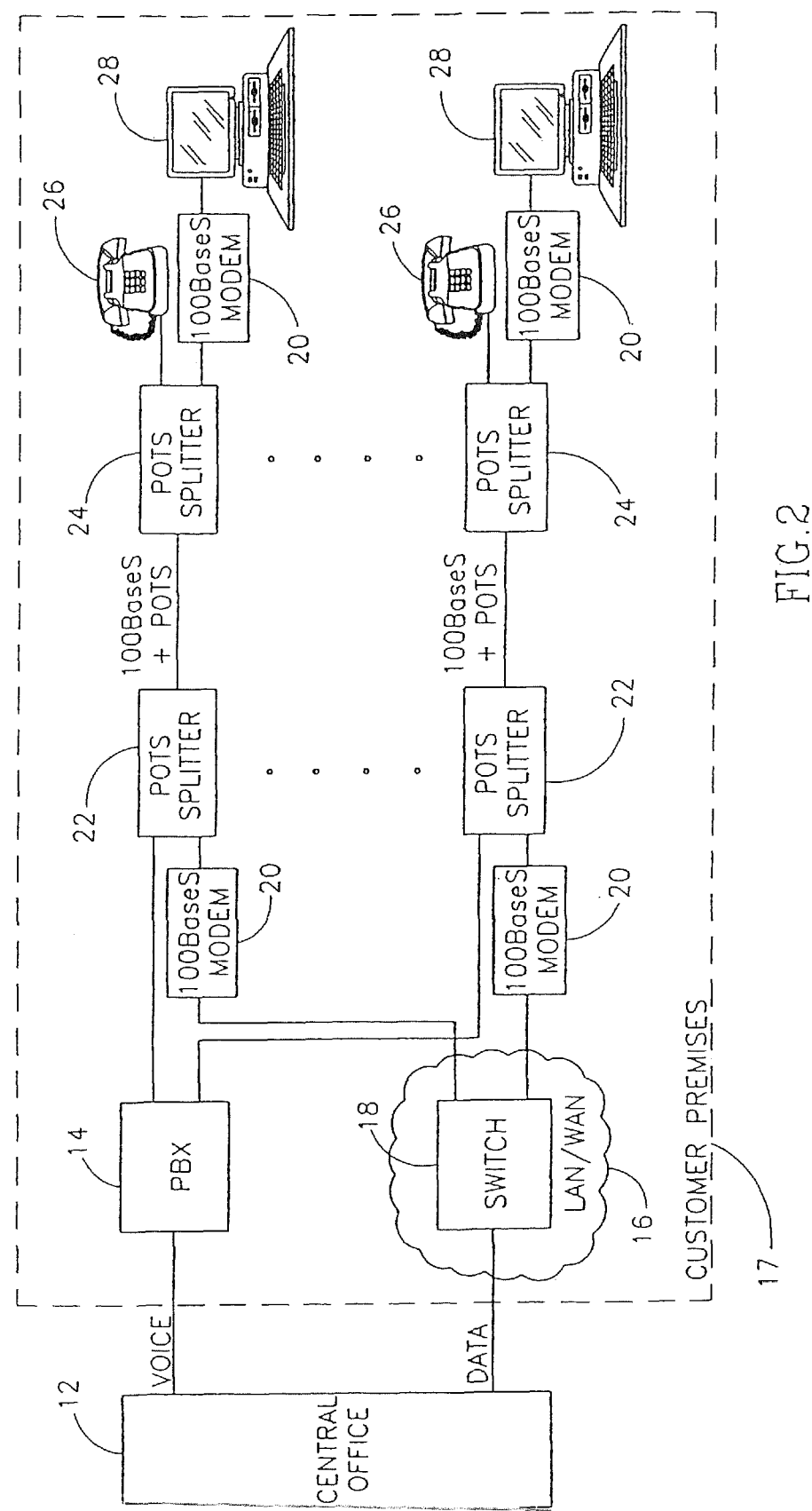
FIG. 2 is a block diagram illustrating a sample customer premises network utilizing the 100BaseS transport facility of the present invention.

A block diagram illustrating a sample customer premises network utilizing the 100BaseS transport facility of the present invention is shown in FIG. 2. This figure shows a central office 12 coupled to a private branch exchange (PBX) 14 and a LAN/WAN 16. The connection between the central office and the PBX carries voice traffic and the connection between the central office and the switch 18 within the LAN/WAN carries data traffic. Both the PBX and the LAN/WAN are located on the customer premises 17.

The PBX is coupled to a plurality of POTS splitters 22 which function to combine the 100BaseS transmission signal from each copper wire pair with the POTS voice signal. The LAN/WAN is shown comprising at least a switch 18, for example, which is coupled to the POTS splitters via 100BaseS modems 20. The LAN/WAN can comprise any combination of network equipment. The LAN/WAN is connected to the 100BaseS modem via a 100BaseT connection. Note that throughout this document, the term POTS splitter implies a device that functions to both split and combine the 100BaseS (up to four twisted wire pairs) and POTS signals.

POTS splitters 22 communicate to POTS splitters 24 which are typically physically located in remote locations in different areas of the customer premises. For example, the customer premises may be large university campus with communication links spanning out to each building within the campus. The communication links would carry a combination of 100BaseS and POTS traffic. With reference to FIG. 2, the links between the POTS splitters 22 and 24 carry a combined 100BaseS transmission signal in addition to the POTS voice signal. The PBX and the network equipment would typically be installed in the telecommunications equipment room that also serves as the service entrance or network termination point (NTP) to the telco lines from the central office.

In FIG. 2, each of the POTS splitters 24 are connected to the telephone voice terminals 26 and 100BaseS modems 20. Any 100 BaseT capable device such as computer workstations 28 can be connected to 100BaseS modems 20.

Figure 3:
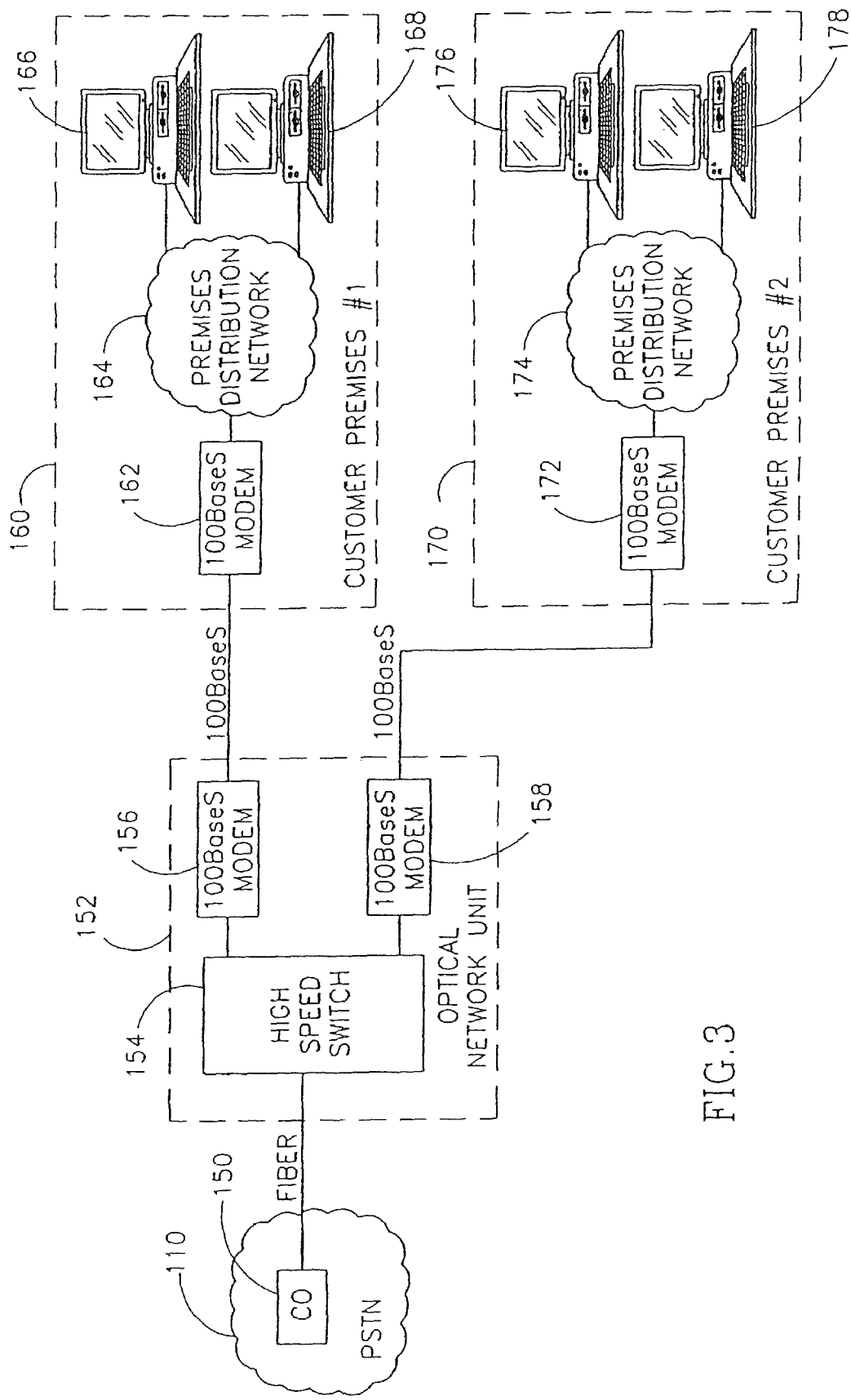
FIG. 3 is a block diagram illustrating an optical network unit connected to multiple customer premises via the 100BaseS transport facility.

A block diagram illustrating an optical network unit connected to multiple customer premises via the 100BaseS transport facility is shown in FIG. 3. An example central office 150 within the PSTN 110 is shown coupled to an optical network unit (ONU) 152. The fiber is terminated on a high speed switch 154 that comprises a plurality of 100BaseT ports. 100BaseS modems 156, 158 are shown coupled via 100BaseT to the high speed switch 154. The 100BaseS modem 156 is coupled to 100BseS modem 162 within customer premises #1 160. The 100BaseS modem 162, in turn, is connected to the premises distribution network 164. The premises distribution network represents any 100BaseT capable network. Shown coupled to the premises distribution network are computer workstations 166, 168.

Similarly, 100BaseS modem 158 is connected to 100BaseS modem 172 located in customer premises # 2 170. 100BaseS modem 172 is connected to the premises distribution network 174. Here too, the premises distribution network 174 represents any 100BAseT capable network. Computer workstations 176, 178 are shown connected via 100BaseT to the premises distribution network.

100BaseS Modem and Framer

Figure 4:
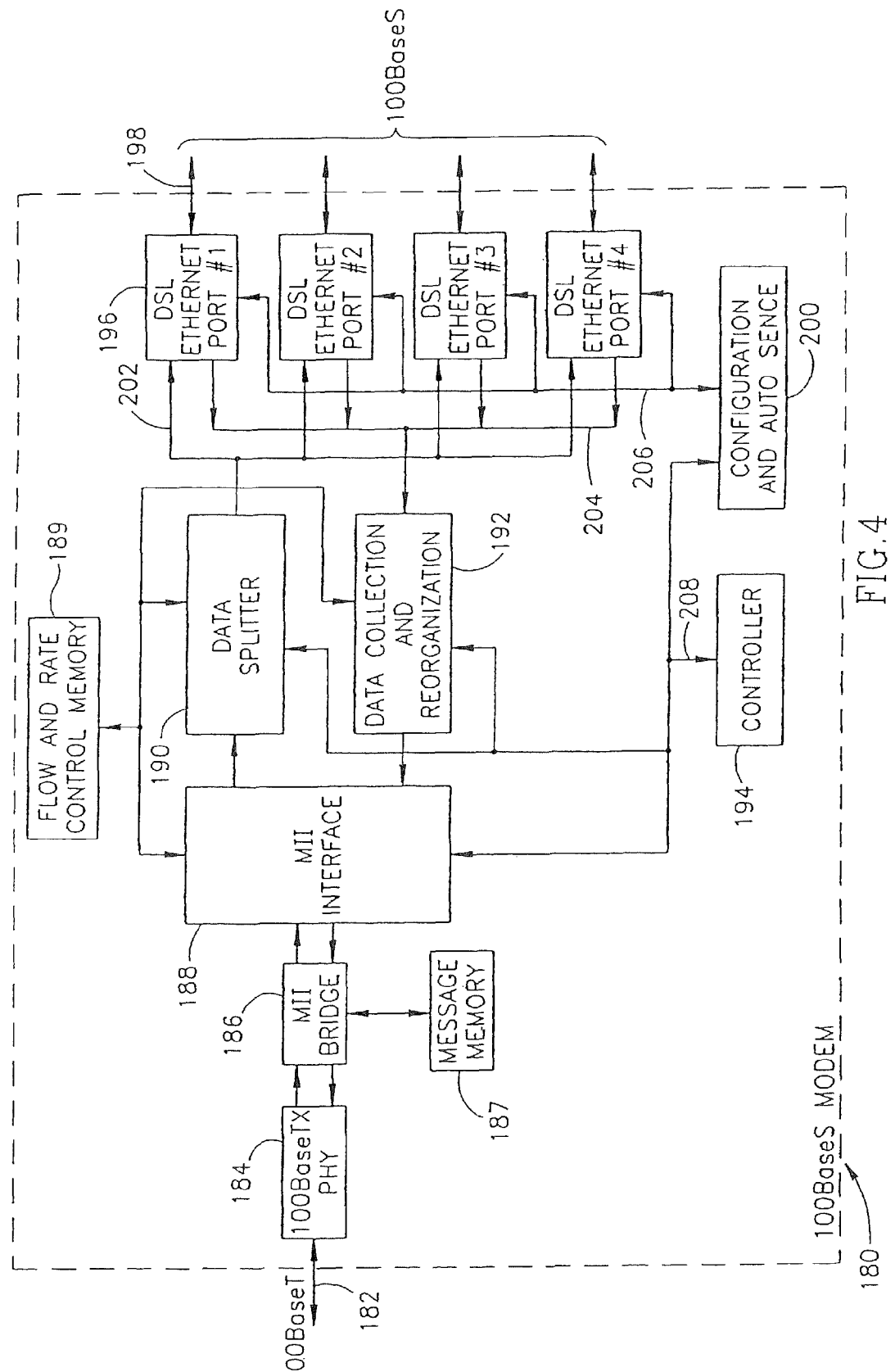
FIG. 4 is a block diagram illustrating the 100BaseS modem of the present invention in more detail.

A block diagram illustrating a preferred embodiment of a modem according to the present invention is shown in more detail in FIG. 4.

The modem 180 as shown in FIG. 4 is a 100BaseS modem provided for symmetric bi-directional transporting of an Ethernet signal over a configurable number (N) of telephone lines. In the shown embodiment of FIG. 4 the number of telephone lines N is four. The 100BaseS modem 180 comprises a physical portion and framer portion. The modem 180 is adapted to provide a bi-directional connection between a 100BaseT port 182 and a 100BaseS port 198.

The physical layer portion in the modem 180 includes a 100BaseTX module 184 which is adapted to receive a 100BaseT signal at a 100BaseT port 182 and to output a signal compatible with the Media Independent Interface (MII) bus specifications. The BCM5203 100Base-Tx Quad Transceiver manufactured by Broadcom Corporation, Irvine, California is suitable for use in the modem according to the present invention and implementing the 100BaseTX PHY module 184.

The MII signal output from the 100BaseTx module 184 is input to a 2 portion MII bridge 186. The bridge 186 is provided for coupling the MII signals from the module 184 to and from a message memory unit 187 and an MII interface 188. The GT48006 2-Port 10/100 Mbps Ethernet Bridge/Switch Controller manufactured by Galileo Technology, San Jose, California is used in a preferred embodiment to implement the MII bridge 186. The message memory 187 is provided for soaking up or compensating any differences in data rate between the two sides of the MII bridge 186.

The data output from the MII bridge 186 is input to the MII interface 188. The MII interface 188 is adapted to receive an MII data stream and to output a decoded representation of the data that is stored in the flow and rate control memory 189. The flow and rate control memory 189 is provided to soak or compensate differences in transmitting rates between the 100BaseTX port 182 and the 100BaseS port 198. The rate difference may be as high as 25 Mbps on the 100BaseS side versus 100 Mbps on the 100BaseT side depending on the number of DSL ports of the second port modem port 198, i.e., the 100BaseS port. Each 100BaseS port comprises a configurable number $N_{port}$ of DSL ports 198 wherein each DSL port is coupled to a corresponding telephone line for data transmission. In the embodiment as shown in FIG. 4 the maximum data transmission rate of one DSL Ethernet port is 100 Mbps. In the case when there is only one DSL port 196 implemented the actual data transmission rate of the 100BaseS modem is limited to 100 Mbps.

The number of DSL Ethernet ports 196 employed in the second port 198 of the modem 180 is configurable up to a maximum number of DSL ports. In the shown embodiments the maximum number of installable DSL Ethernet ports 196 is four. An alternative embodiment number $N_{port}$ is higher, i.e., 8 or 16 DSL ports. The controller 194 is adapted to manage, administer and control the MII interface 188 and the data splitter 190 as well as the data collection and reorganization unit 192.

The data splitter 190 functions to divide the single data stream previously stored in the flow and rate control memory 189 into separate output data streams. The number of separate output data streams is determined by the number of installed DSL ports 198. The modem 180 according to the present invention employs the technique of inverse multiplexing, i.e., spreading a single high data rate signal over several lower data rate channels to achieve a high data rate over several telephone lines. Each output data stream is destined to a separate DSL Ethernet port 196 via internal data lines 202 which are connected to the DSL Ethernet ports 196-1, 196-2, 196-3, 196-4. In the embodiment of FIG. 4 four DSL Ethernet ports 196 are provided. Between 1 up to 4 DSL Ethernet ports modules 196 can be used depending on the configuration of the modem 180. The 100BaseS modem 180 as shown in FIG. 2 supports up to four DSL Ethernet ports 196 for data range between 10 to 100 Mbps in 1 (one) Mbps increments.

With diminishing distance between the modem 180 at the central office size and the modem 180 at the customers premise the data rate of transmission and receiving DSL signals via a DSL Ethernet port is increasing. The maximum data rate for a modern DSL Ethernet port can reach up to 100 Mbps for each DSL Ethernet port over a short distance e.g. 100 m. In the embodiment of the modem 180 with four separate telephone lines connecting DSL Ethernet ports 196 on both sides over such a short distance it is possible to achieve an aggregated data rate of four times 100 Mbps, i.e., 400 Mbps in 100 Mbps increments.

Each DSL Ethernet port 196 comprises a modulator and demodulator module that modulates the data stream input from the data splitter 190 to a 100BaseS DSL signal. The modulator/demodulator module demodulates the received 100BaseS signal to an output data stream which is input to the data collection and reorganization unit 192. The data collection reorganization unit 192 is provided to receive the demodulated data from up to four DSL Ethernet ports 196 via control and data lines 204 and to assemble the several data streams into a single data stream which is stored in the flow and rate control memory 189. The stored data is then read from the memory 189 and applied to the MII interface 188. The MII interface 188 outputs the data in the MII data format to the 100BaseTX physical layer module 184 via the MII bridge 186. The physical layer module 184 converts the data from the MII format into a 100BaseT Ethernet compatible signal 182.

The modem 180 according to the present invention has the capability to automatically sense the number of DSL Ethernet port cards 196 installed in the modem. A configuration and auto sense unit 200 is connected to the port modules 196 via control/data lines 206. The configuration and auto sense unit 200 senses the number of installed DSL Ethernet ports, e.g.

when only three Ethernet ports are installed instead of the maximum number of four DSL Ethernet ports 196. Further the configuration auto sense unit 200 determines the location of the active DSL Ethernet port, i.e. the port address of the active or installed DSL Ethernet ports 196. For example the configuration output sense unit 200 realizes that DSL Ethernet ports 196-1, 196-2, 196-4 are installed whereas DSL Ethernet port 196-3 is not installed (see also FIG. 12A). There are several ways to sense the installation of DSL Ethernet port card 196 in the modem 180. Possible ways are a software inquiry by the configuration auto sense unit 200, hardware sensors or external configuration control signals provided to the configuration and auto sense unit 200.

The configuration and auto sense unit 200 supplies the determined number Nfour of DSL Ethernet port cards 196 installed in the modem 180 to a modem controller 194 via control lines 208. The controller 194, in turn, configures and controls the MII interface 188, the data splitter 190, the data collection and reorganization 192.

In a preferred embodiment each DSL Ethernet port 196 measures a maximum possible data rate for data transmission on the telephone line connected to the respective DSL Ethernet port 196. For this purpose each DSL Ethernet port 196-i establish a data exchange link and measures a signal to noise ratio SNR of a probing signal. The DSL Ethernet port calculates its possible maximum data rate DRi and indicates a measured maximum data rate DRimax to the configuration and auto sense unit 200. The configuration and auto sense unit 200 comprises a memory and stores the received maximum data rate of the respective DSL Ethernet port 196 in a table such as shown in FIGS. 12A, 12B. In the example shown in FIG. 12A the DSL Ethernet port 196-3 is not installed, Ethernet port 196-1, 196-2 have a maximum data transmission rate 25 Mbps whereas the fourth installed DSL Ethernet port 196-4 has only a maximum data transmission rate of 10 Mbps.

In the example shown in FIG. 12B all four DSL Ethernet ports 196 are installed and achieve a maximum data rate of 25 Mbps. In the example of FIG. 12B the output of each DSL Ethernet port module 196 is a 25 Mbps data stream (payload data rate).

The data output of the modem 180 comprises an upstream data channel for outputting data near the second port 198 of the modem 180. The 25 Mbps raw data rate is used to generate a 28.125 Mbps linear rate data stream which includes protocol overhead data such as forward error correction coding, header data, control information etc. In a preferred embodiment, the upstream data channel is transmitted using QAM 16 wherein each data symbol represents 4 bits. The baud rate for the upstream channel is given by $$\text{Upstream baud rate} = \frac{28.125 \; Mbps}{4 bits/symb} = 7.0313 \; Msymbols/s \quad (1)$$

The bandwidth required, using 20% excess, for the upstream channel is thus 1.2×7.0313=8.4375 MHz. Using a sampling rate twice that of the data rate 2×28.125=56.25 Msamples/sec yields a ratio of the sampling rate to baud rate equal to 8. A suitable analog to digital converter (ADC) for use in the modem according to the present invention samples the received 100BaseS signal as i.e. the AD6640 12-bit ADC featuring a sampling rate of 65 Msamples/sec, available from Analog Devices, Norwood, Mass.

The downstream data channel also utilizes QAM for its modulation but rather than QAM 16, the downstream data channel utilizes QAM 64 in a preferred embodiment. In this case each symbol represents 6 bits and the baud rate of the downstream data channel is given by $$\text{Upstream baud rate} = \frac{28.125 \; Mbps}{6 bits/symb} = 4.6875 \; Msymbols/s \quad (2)$$

The frequency bandwidth required, using 20% excess for the downstream channel is thus 1.2×4.6875=5.6250 MHz. Using a sampling rate twice that of the data rate, i.e., 56.25 Msample/sec, yields a ratio of the sampling rate to baud rate equal to 12.

Figure 5:
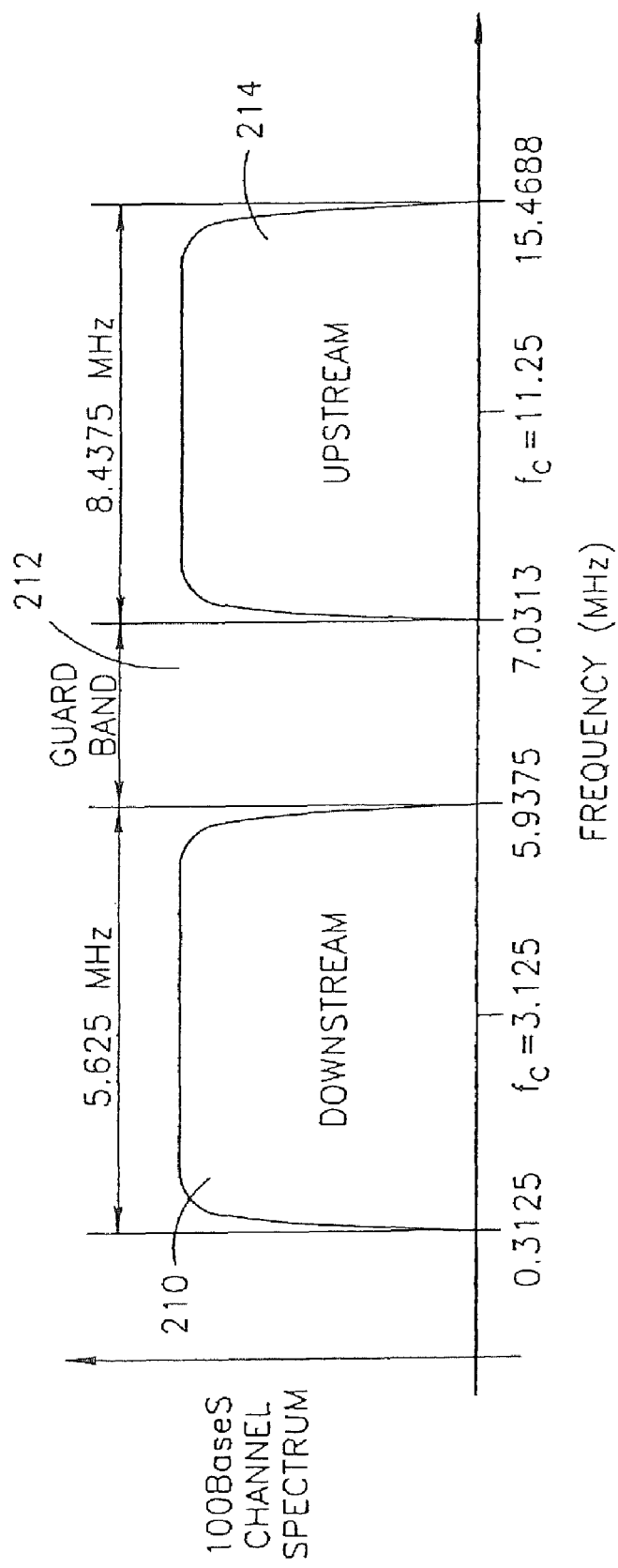
FIG. 5 is a diagram illustrating the 100BaseS modem of the present invention in more detail.

The spectrum diagram of the 100BaseS signal comprising both upstream and downstream signals is shown in FIG. 5. The data channel comprises a 5.625 MHz downstream portion 210 that spans frequencies from approximately 0.3125 MHz to 5.9375 MHz with a center frequency $f_c$ of 3.125 MHz. The data channel also comprises an 8.4375 MHz upstream portion 214 that spans frequencies from approximately 7.0313 MHz to 15.4688 MHz with a center frequency $f_c$ of 11.25 MHz. Residing in between the downstream and upstream portions is a guard band spacing of approximately 15% of the center frequency.

Figure 9:
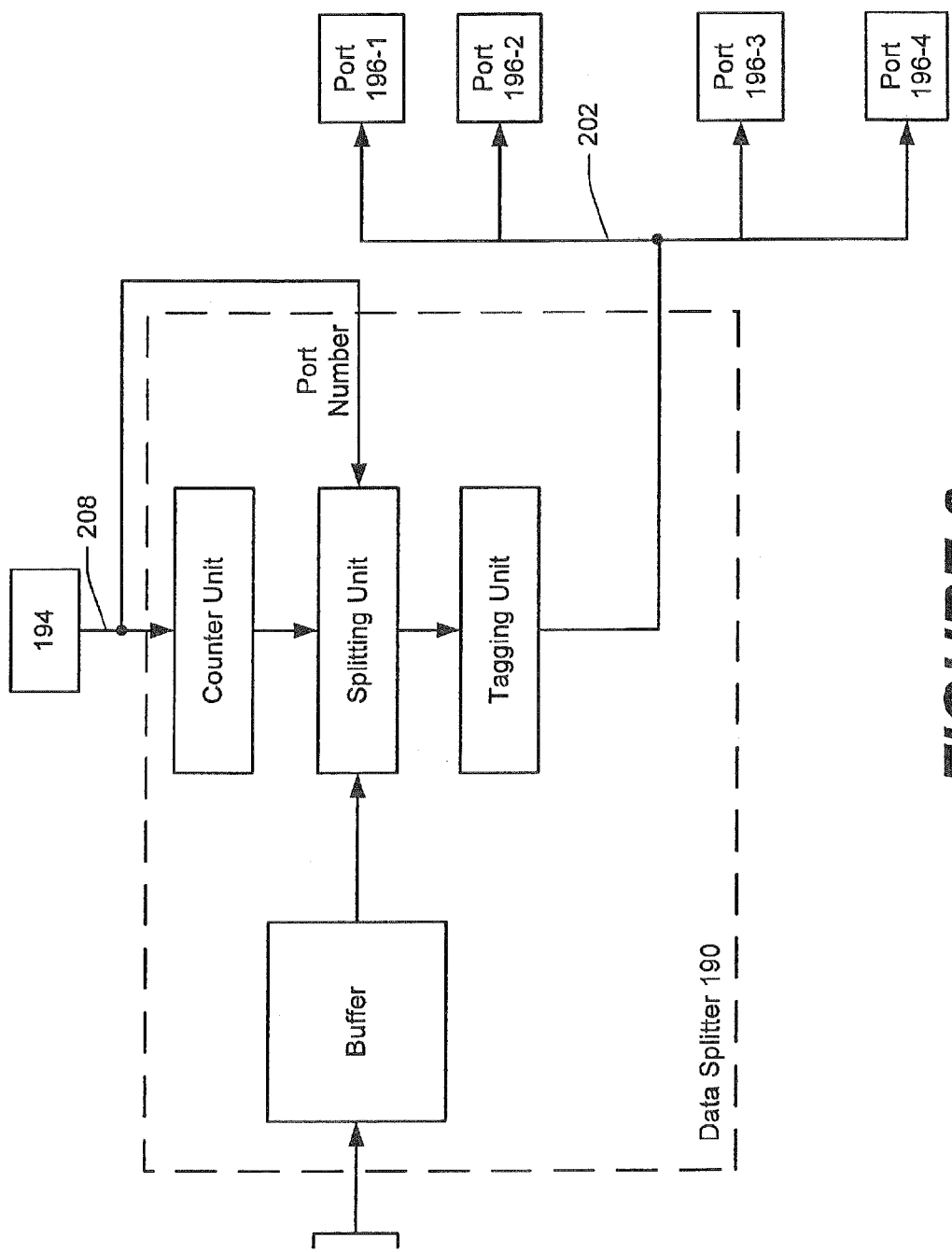
FIG. 9 is a block diagram of a data splitter within a modem according to the present invention.

FIG. 9 shows a preferred embodiment of the data splitter 190 according to the present invention. The data splitter 190 comprises a buffer buffering frames of the single Ethernet signal received by the first port 182 of the 100BaseS modem 180. The frames are split by a splitting unit which splits the Ethernet data frames of the single Ethernet signal into split frames depending on the number $N_{port}$ of installed active DSL ports 196 and the data transmission rates $DR_i$ of the respective active DSL ports 196. The splitting unit is connected to a counter unit providing count values for the splitting process. Further the splitting unit receives the number ($N_{port}$) of installed ports e.g. three DSL Ethernet ports having the data rates as shown in FIG. 12A. The splitting unit splits each received frame according to the number of DSL ports 196 which are active and according to the ratio of the data rates between the DSL ports 196 so that there is a load balancing of the data traffic between the DSL ports 196.

The splitting can be performed in several ways. If, for instance, it is detected that there are three DSL ports active (for instance DSL port 196-1, 196-2, 196-4), all having the same data transmission rate i.e. 25 Mbps the splitting unit distributes in a first embodiment the received stream of Ethernet frames in such a manner, that the first received Ethernet frame EF1 is supplied to port 196-1, the second received Ethernet frame EF2 is supplied to the second port 196-2 and the third received Ethernet frame EF2 is supplied to the third active DSL port 196-4. The next Ethernet frame EF4 is then again supplied to the first DSL port 196-1, the fifth Ethernet frame EF5 is supplied to the second DSL port 196-2 and so on.

The counter unit counts the available number of bytes that can be accepted by the active DSL ports 196. They are used to allocate the frame fragments or bit frames that are created during the frame splitting process.

If the data rates of the active DSL ports 196-i are different the splitting unit of the data split 190 takes this into account by balancing the output data traffic according to the data rates. The controller 194 provides a splitting unit with the data rates $DR_i$ of the installed active DSL ports 196. In the example shown in FIG. 12A the splitting unit provides in a preferred embodiment 25 bytes of the received Ethernet frame to DSL port 196-1, the next 25 bytes of the frame to DSL port 196-2 and the next 10 bytes to the third active DSL port 196-4. The splitting unit of the data splitter 190 supplies the split frames or frame fragments to a tagging unit. The tagging unit is provided for tagging the split frames with sequence numbers and with the port numbers of the respective DSL ports 196 to which the split frames are transmitted by the tagging unit.

In the example of FIG. 12A the first bit frame comprising 25 bytes of payload data is tagged with the sequence number 1 and with the port number of the destination DSL port 196-1. The next data fragment or split frame is tagged to the sequence number 2 and the DSL port number of port 196-2. The third bit frame receives the sequence number 3 and the port number of DSL port number 196-4 and so on. The sequence number is provided so that the reorganization function in the receiver is able to put the split frames back together in the correct order. This is necessary, because each DSL port 196 has a different time delay which has to be compensated. These split frames passed via lines 202 to the corresponding Ethernet port 196-*i* for transmission over the telephone line connected to that port 196-*i*.

Figure 10:
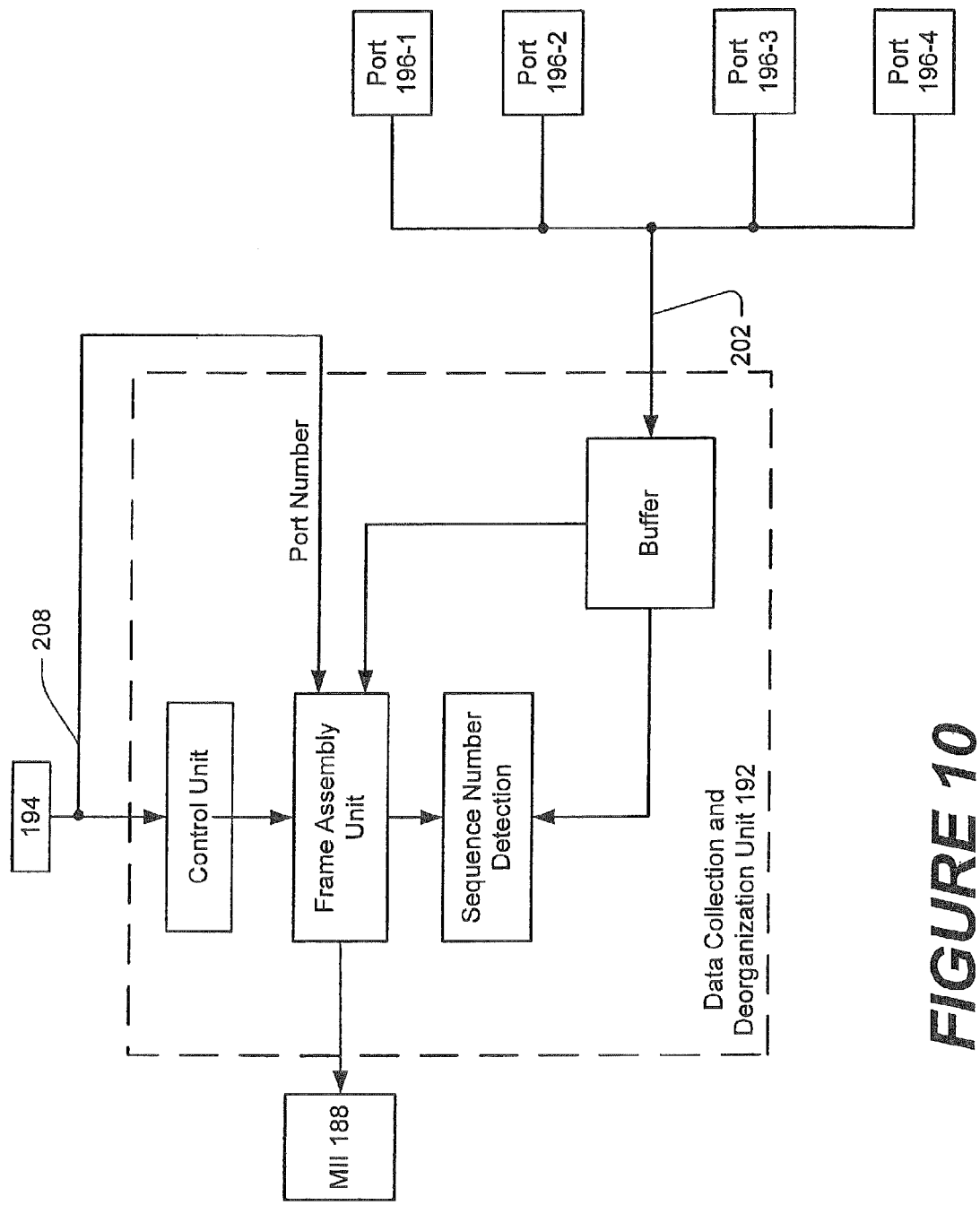
FIG. 10 is a block diagram of a data collection and reorganization unit within a modem according to the present invention.

FIG. 10 shows a block diagram of a data collection reorganization unit 192 provided in the 100BaseS modem 180 as shown in FIG. 4. The data collection reorganization unit 192 comprises a buffer for a reception of the split frames from the DSL ports 196-*i*. A sequence number detection unit is provided for detecting the sequence numbers of the received split frames and supplies the detected sequence number to a frame assembly unit. The frame assembly unit receives the detected sequence number from the sequence number detection unit and the split frames from the buffer of the data collection reorganization unit 192. Further the frame assembly unit is connected to a counter unit and receives the number of active ports ($N_{port}$) from the controller 194. The frame assembly unit assembles the split frames to Ethernet data frames of a single Ethernet signal depending on the detected sequence number and the port number of the respective DSL port 196 from which the data collection and reorganization unit 192 receives the split frames over lines 202. The assembled Ethernet frames are supplied to the MII Interface 188.

Figure 11:
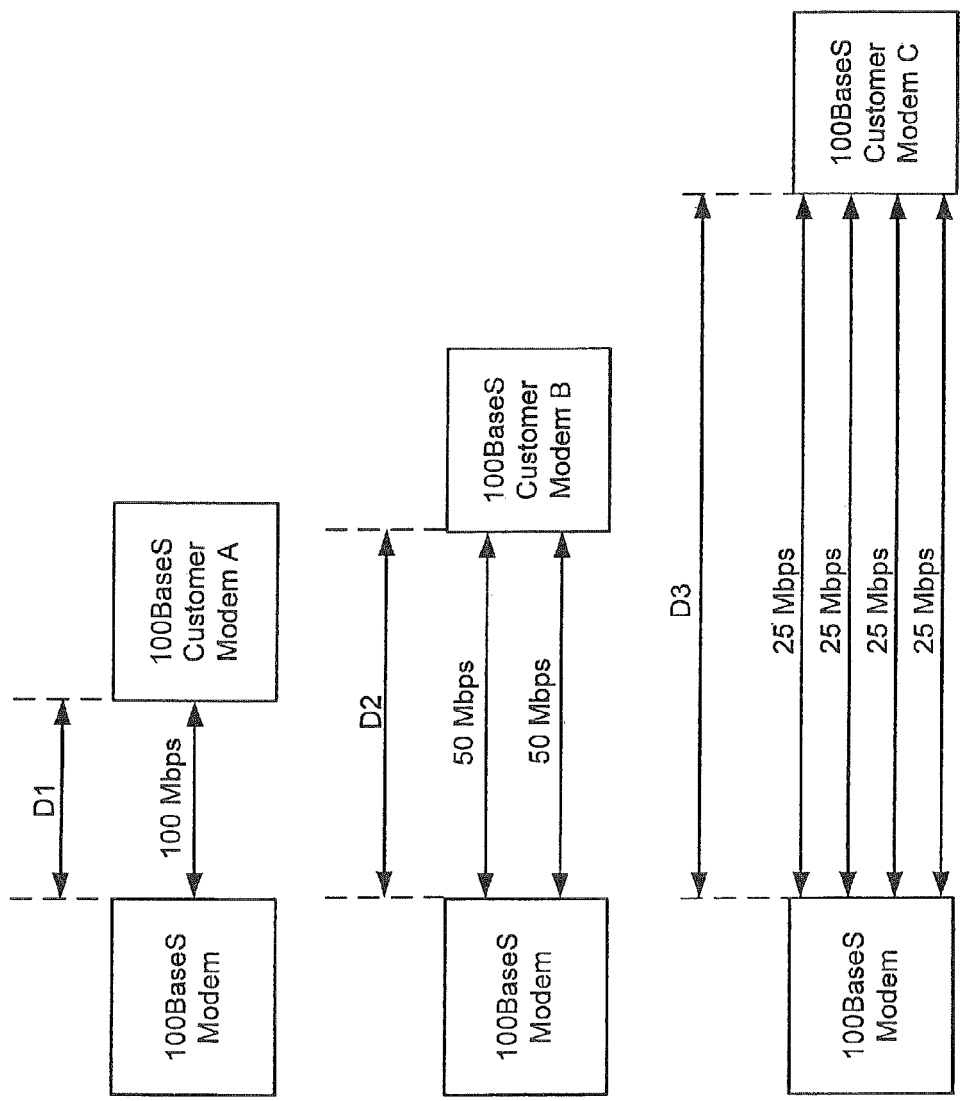
FIG. 11 shows a diagram for illustrating the application of a modem according to the present invention.

FIG. 11 shows an application of the 100BaseS modem 180 as shown in FIG. 4. In the given examples the customers A, B, C are located at different distances D1, D2, D3 to the next 100BaseS modem within a central office facility. The first customer A of a 100BaseS modem is located at a very short distance e.g. D1=100 m close to the 100BaseS modem within in the central office facility. The next customer B is located in a distance D2 of e.g. 300 m. The last customer C is located in a long distance D3 of i.e. 1.000 m.

Modem 196 DSL Ethernet ports are able to achieve maximum data rates of 100 Mbps over a short distance such as D1. In the given example the customer A will be connected to a 100BaseS modem over only one telephone line which exchanges the DSL signal at a data rate of 100 Mbps between both modems. In the second case with a distance D2=300 m the DSL ports support in the given example only a data rate of 50 Mbps so that it is necessary to connect the customer B via two telephone lines each transmitting data at a rate of 50 Mbps. At a very long distance D3 e.g. of 1.000 m even modem DSL Ethernet ports 196 only achieve a data rate of 25 Mbps, so that the customer C is connected to the 100BaseS modem of the central office facility over four telephone lines.

Accordingly the 100BaseS modem according to the present invention having a configurable number $N_{port}$ of DSL ports 196 makes it possible to connect customers having a different distance from the central office facility in such a way that all customers can be provided with data at the same aggregated data rate (e.g. up to 100 Mbps as shown in FIG. 11). The modem 180 according to the present invention provides a high flexibility when building up a telecommunication infrastructure wherein the customers have a variable distance D to the central office facility.

Modem Transmitter

Figure 6:
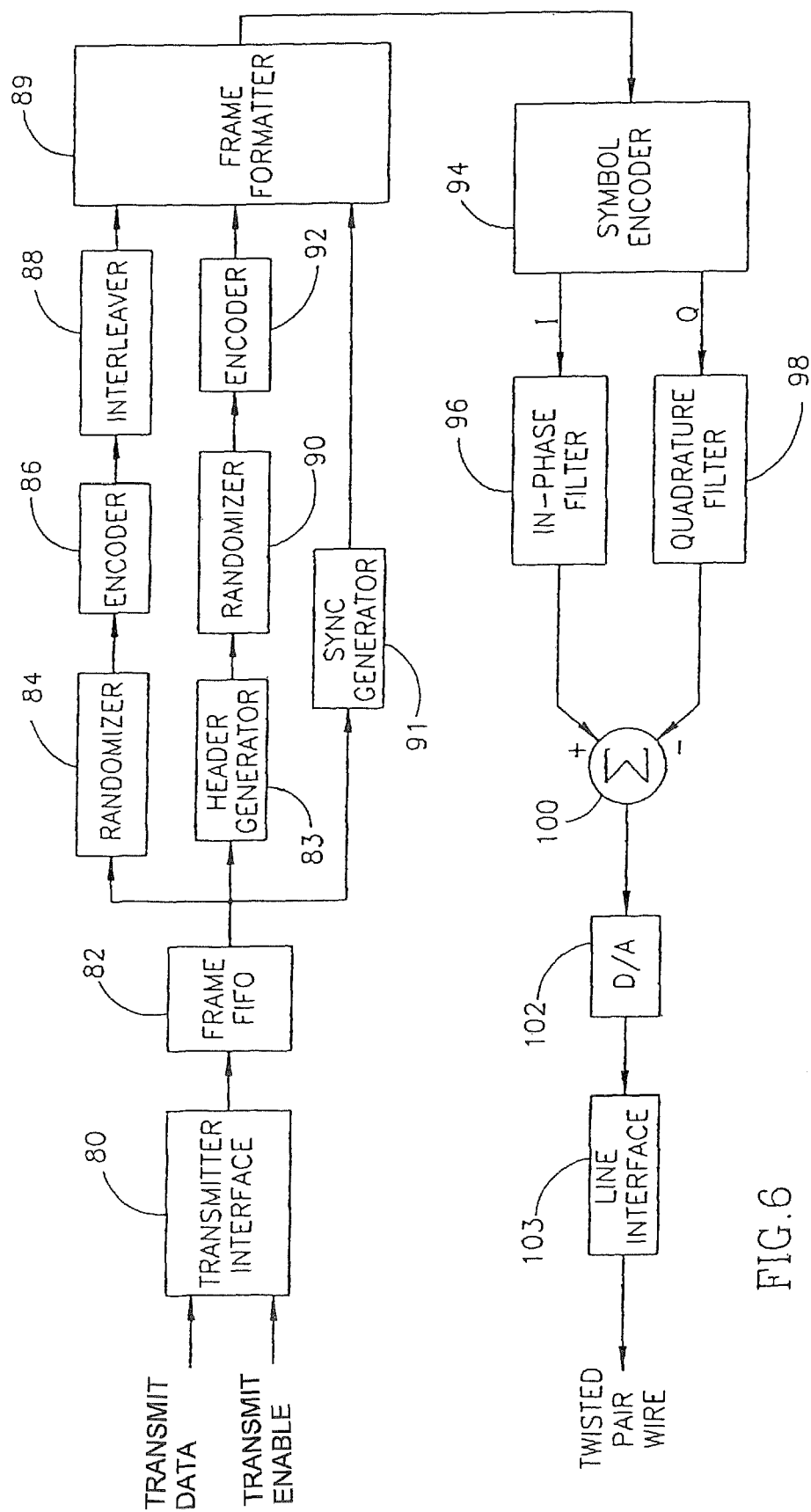
FIG. 6 is a block diagram illustrating the transmit portion of the 100BaseS modem of the present invention in more detail.

A block diagram illustrating the transmit portion of the 100BaseS modem of the present invention in more detail is shown in FIG. 6. Note that each DSL Ethernet Port card 196 (FIG. 4) comprises an independent modem transmitter and receiver. Therefore, the following description of the modem transmitter and receiver applies to each DSL Ethernet Port card. The data source feeding the modem supplies a transmit data signal and a transmit enable signal to the transmitter interface 80 of the 100BaseS modem. The transmit enable signal to the transmitter interface 80 of the 100BaseS modem. The transmit interface inputs digital data to the frame first in first out (FIFO) 82. The FIFO functions to adjust the rate of data flow between data source and the modem itself. The FIFO compensates for differences in the data rates between the two devices. The output of the FIFO is input to a sync generator 91, header generator 83 and the randomizer 84. The sync generator functions to generate the output two sync bytes to the frame formatter 89. Preferably, the two sync bytes are F6H and 28H. The header generator functions to generate header information that typically spans a plurality of bytes. The heater itself is then randomized or scrambled by randomizer 90 and subsequently encoded by encoder 92. The output of the encoder is input to the frame formatter.

The data from the frame FIFO is input to the scrambler or randomizer 84 that functions to scramble the data. The output of the randomizer is input to the encoder 86 that functions to encode the data stream. The output of the encoder is input to the interleaver 88 which, in combination with Reed Solomon encoding used in the transmitter and the receiver functions to shuffle the data to help overcome impulse type noise thus resulting in improved error recovery. The output of the interleaver is input to the frame formatter 89.

The frame formatter 89 functions to assemble a complete frame comprising the sync, header and data stream output from the interleaver. The output of the frame formatter 89 is input to the symbol encoder 94 which functions to generate the in band I and quadrature Q digital output signals from the input digital data stream. The I and Q channels are input to an in phase filer 96 and a quadrature filter 98, respectively. The output of the quadrature filter 98 is subtracted from the output of the in band filter via a digital summer or adder 100. The output of the summer is converted to analog via D/A converter 102. The analog output signal is input to the line interface unit 103 which places the output signal from the transmitter onto the twisted pair wire 198 (FIG. 4).

Modem Receiver

Figure 7A:
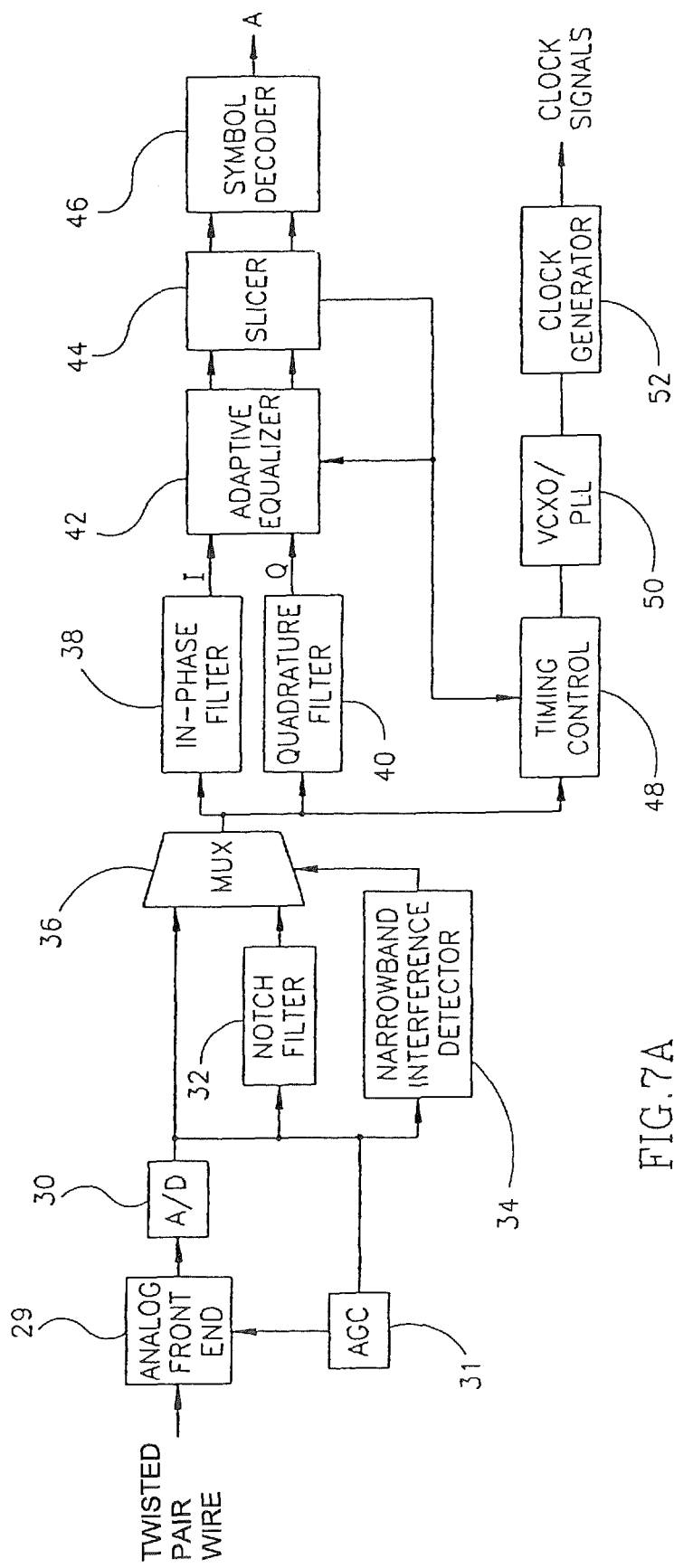
FIGS. 7A and 7B are block diagrams illustrating the receive portion of the 100BaseS modem of the present invention in more detail.
Figure 7B:
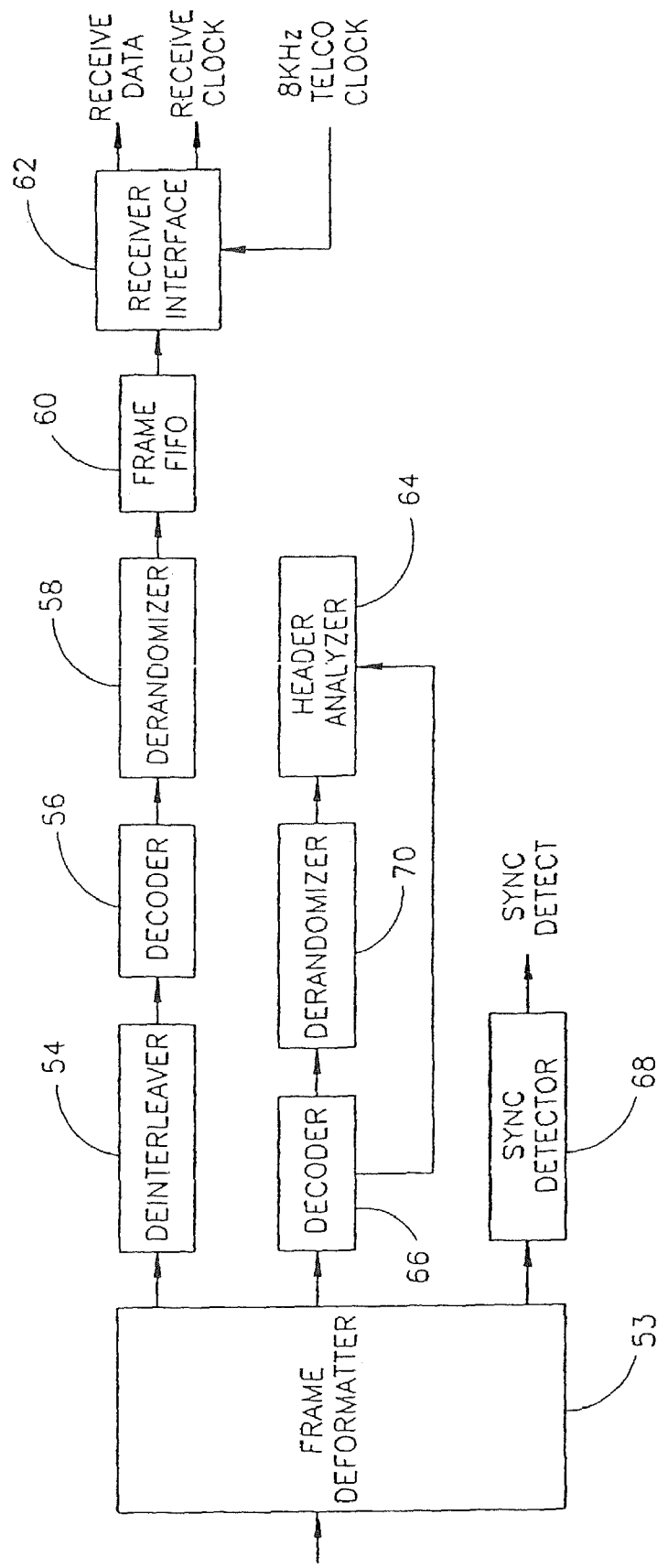

Block diagrams illustrating the receive portion of the 100BaseS modem of the present invention in more detail are shown in FIGS. 7A and 7B. The twisted pair wire 198 (FIG. 4) is coupled to an analog front end 29 which functions to interface the 100BaseS modem to the wire and to amplify the received analog signal. The output of the analog front end is converted to digital via A/D converter 30. The output of the A/D converter is input to an automatic gain control (AGC) circuit 31. The output of the A/D converter is also coupled to a multiplexer (mux) 36, notch filter 32 and a narrowband interference detector 34. The output of the notch filter 32 is connected to the second input of the mux 36. The narrowband interference detector functions to detect the presence of amateur radio signals that lie in the frequency range of 1.8 to 2 MHz. If sufficient signal levels in the amateur radio band are detected in the received signal, the mux is set to switch the output the notch filter to its output. The center frequency and the bandwidth of the notch filter is set to cover the amateur radio band.

The output of the mux 36 is input to an in phase filter 38, a quadrature filter 40 and a timing control circuitry 48. The I and Q signals, output of the in phase and quadrature filters, respectively, are input to the adaptive equalizer 42. The I and Q outputs of the adaptive equalizer are input to the slicer 44. The slicer generates a feedback signal to control the adaptive equalizer and the timing control circuitry. The timing control circuitry outputs a signal to the voltage controlled crystal oscillator (VCXO)/phase lock loop (PLL) 50. The output of the PLL is input to clock generating circuitry that functions to produce the clock signals used internally by the modem.

The I and Q outputs of the slicer are input to the symbol decoder 46 which functions to make a best determination from among the constellation points according to the I and Q input signals. The bits representing the symbol are output by the symbol decoder and input to the frame deformatter 53. The frame deformatter 53 is coupled to the deinterleaver 54, decoder 66 and the sync detector 68. The sync detector 68 functions to match the sync pattern and hunt for multiple sync occurrences in the input data stream. Once a sync is detected, the header data is read from the frame by the frame deformatter and input to the decoder 66. The output of the decoder 66 is input to the derandomizer 70. The output of the decoder 66 and the derandomizer 70 are input to the header analyzer 64. The header is analyzed to detect missing frames, perform addressing functions, etc.

The frame deformatter 53 also outputs a data stream to the deinterleaver 54 that functions to deshuffle the data. The output of the deinterleaver 54 is input to the decoder 56. The output of the decoder 56 is input to the derandomizer 58 which functions to descramble the data. The output of the derandomizer 58 is input to the frame FIFO 60 which adjusts for the difference in data rates between the modem and the communication device connected to it. The output of the frame FIFO is input to the receive interface 62 which outputs a receive data signal. A receive clock generated by the data device connected to the modem is input to the receive interface and functions to provide the clocking signal for the receive data.

Modulation Characteristics

The modulation characteristics of the 100BaseS system of the present invention will now be described in more detail. The 100BaseS system can transmit at full duplex on a configurable number of category 3 or 5 (CAT-3 or CAT-5) shielded or unshielded twisted pair (UTP) wires utilizing frequency division multiplexing (FDM). The system supports a rate transmission of e.g. 28.125 Mbps in each direction simultaneously. The payload rate, after accounting for forward error correction (FEC), control overhead, control information, etc. is 25 Mbps on each twisted pair wire. Thus, the system supports in one embodiment payload transmission rates of 25, 50, 75 and 100 Mbps.

The system utilizes quadrature amplitude modulation (QAM), with a square root raised cosine shaping filter at the transmitter and a matched filter at the receiver. The roll-off factor of the square root raised cosine filter is 0.2. The downstream channel utilizes QAM-64, providing a spectral efficiency of 6 bits/symbol. The upstream channel utilizes QAM-16, providing a spectral efficiency of 4 bits/symbol.

The upstream channel uses QAM-16 with less bits per symbol than the modulation used for the downstream channel due to the attenuation of the telephone line at higher frequencies. The upstream channel band is placed at a higher frequency than the downstream channel. Thus, the bandwidth of the upstream channel is necessarily higher in order to achieve the same data rate.

The transmitted power output by the system onto the twisted pair wire is preferably limited to 10 dBm (10 mW) in each direction. This power limit is widely incorporated into existing standards such as ANSI and ETSI. The transit power is limited in order to limit the power spectral density (PSD) on the wire. The downstream power is thus fixed but the power transmitted on the upstream direction is controlled by the downstream link in accordance with the length of the wire so as to maintain the received power in the upstream direction at a constant level. Transmit power control is necessary in order to prevent excessive far end crosstalk (FEXT) to other upstream channels.

The performance of the system is affected by several noise sources. One of these noise sources is far-end cross talk (FEXT). The power spectral density (PSD) introduced by the FEXT can be described by Equation 3 below.

$$PSD_{FEXT}(f) = PSD_{Tx} \cdot |H[f]| \cdot \left(\frac{N}{49}\right)^{0.6} (9 \times 10^{-20}) \cdot d \cdot f^2 \quad (3)$$

where $PSD_{Tx}$ is the power spectral density of the transmitted signal, N is the number of disturbers, i.e., the number of wire pairs used to transmit the 100BaseS signal (from 1 to 4), d is the distance of the wire in feet and f is the frequency of radiation in Hz. The PSD, $S_R(f)$, of the received signal can be expressed as the following.

$$S_R(f) = S_T(f) \cdot |H(f)|^2 \quad (4)$$

where $S_t(f)$ is the PSD of the transmitted signal and H( ) is the frequency response or the transfer function of the twisted pair at the specified wire length.

Figure 8:
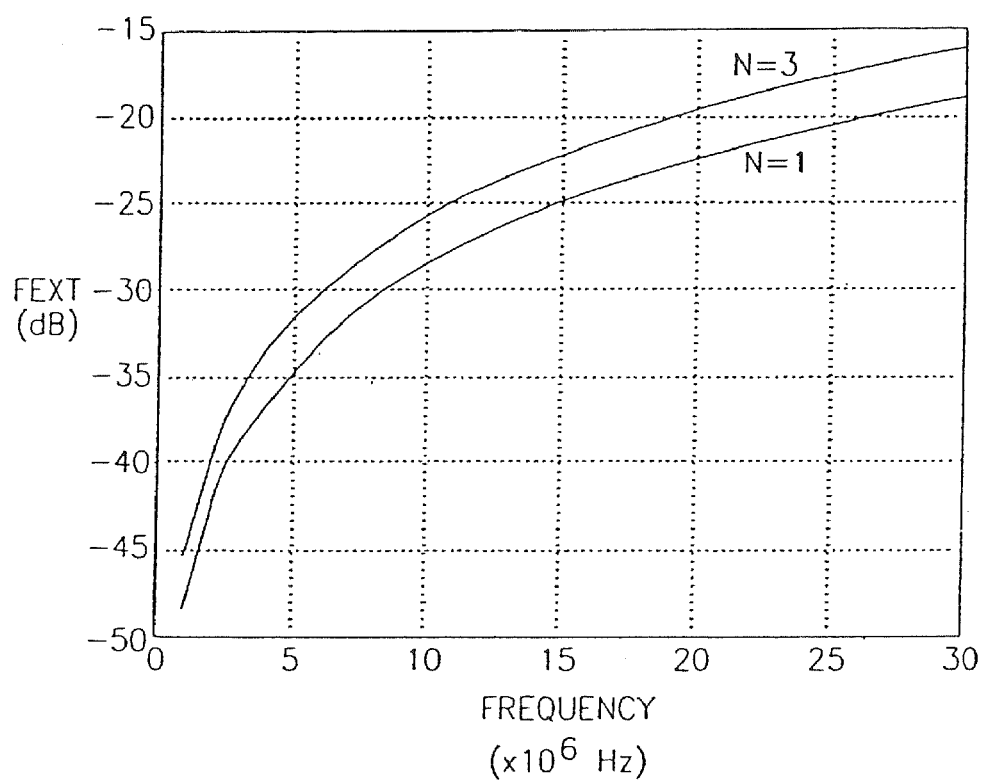
FIG. 8 is a diagram illustrating the far end cross talk at 500 meters for an example implementation of the 100BaseS.

A diagram illustrating the far end cross talk at 500 meters for a sample implementation of the 100BaseS is shown in FIG. 8. Two curves are shown in the graph, one for a single twisted pair (N=1) and for three twisted pairs (N=3). Using the curve for three twisted pairs as an example, the FEXT for the upstream channel is approximately −22 dB which is acceptable since QAM 16 requires 19 dB. Likewise, the FEXT for the downstream channel is approximately −30 dB which is also acceptable, as QAM 64 requires 25 dB.

Another type of noise is near-end crosstalk (NEXT). The system, however, does not generate near end cross talk because there is no overlap in frequency between the upstream frequency band and the downstream frequency bands in the same binder.

Yet another source of noise that can affect system performance is thermal noise. Typical thermal noise $N_0$ in the system is at a one sided power level of −140 dBm/Hz. Thermal noise, however, can be neglected when compared to the effect of self FEXT from the other zero to three lines.

After FEC, the bit error rate (BER) is $10^{-9}$ or less. As described below, the performance specified above is achieved with a 6 dB margin. The maximum ranges listed in the table above are supported by the mathematical calculations presented below.

The capacity and range of the system will now be described in more detail. The theoretical upper limit on the number of bits per second, i.e., capacity, of a transmission channel is given by the well known Shannon formula $$c = \int_{f_{min}}^{f_{max}} \log_2\left[1 + \frac{S_R(f)}{N(f)}\right] df$$

where $f_{min}$ and $f_{max}$ are the lower and upper frequencies of the channel, $S_R(f)$ is the power spectral density of the received signal and $N(f)$ is the power spectral density of the noise. The power spectral density of the noise is given by $$N(f) = N_{FEXT}(f) + N_0 \quad (5)$$

The power spectral density of the received signal is as given above $$S_R(f) = S_T(f) \cdot |H(f)|^2 \quad (6)$$

where $S_t(f)$ is the power spectral density of the transmitted signal. The transmitted signal is a raised cosine with a bandwidth excess of 20% and total power of 10 dBm. $H(f)$ is the frequency response or the transfer function of the twisted pair at the specified wire length. Since it preferable to have a 6 dB margin in systems performance, the Shannon capacity formula is utilized with an artificial factor of 0.25, i.e., $0.25 \cdot S(f)$ is used rather than $S(f)$.

The full channel capacity cannot be achieved with QAM modulation, but trellis coding can be used to get close to the full capacity. Without trellis coding, QAM modulation can achieve 50% or more of the capacity using sufficiently rich constellations. As a rule of thumb, QAM modulation with L constellation points can be used to transmit approximately $\log_2$ bits/symbol at a BER or $10^{-5}$, before forward error correction, if the following expression is satisfied for the signal to noise ratio (SNR).

$$SNR \geq 6 + 3 \log_2 L \text{ dB} \quad (7)$$

The SNR can be defined as $$SNR = \frac{1}{f_{max} - f_{min}} \frac{\int_{f_{min}}^{f_{max}} S_R(f) df}{\int_{f_{min}}^{f_{max}} N(f) df} \quad (8)$$

In the system of the present invention QAM-256 can be utilized if the SNR of the channel is at least 30 dB. QAM-16 can be utilized if the SNR of the channel is at least 18 dB. However, a 6 dB noise margin is preferably added to these numbers to yield a threshold of 36 dB for QAM-256 and a threshold of 24 dB for QAM-16.

While the invention has been described with respect to a limited number of embodiments, it will be appreciated that many variations, modifications and other applications of the invention may be made.

We claim:

1. A modem for bi-directional transporting of an Ethernet signal over a configurable number of telephone lines, comprising:
   (a) a first port connected to a physical layer module configured to receive and transmit a single Ethernet signal;
   (b) a data splitter configured to split the received Ethernet signal into the configurable number of downstream data signals;
   (c) a second port comprising the configurable number of Digital Subscriber Line (DSL) ports coupled to said data splitter,
   wherein each Digital Subscriber Line (DSL) port is configured to transmit a separate downstream Digital Subscriber Line (DSL) signal having a configurable downstream data rate,
   wherein each Digital Subscriber Line (DSL) port is further configured to receive a separate upstream Digital Subscriber Line (DSL) signal having a configurable upstream data rate, and
   (d) a data collection and reorganization unit coupled to said Digital Subscriber Line (DSL) ports and configured to assemble said upstream Digital Subscriber Line (DSL) signals into the single Ethernet signal for transmission by said physical layer module.

2. The modem according to claim 1, wherein the data splitter comprises:
   a splitting unit which splits the Ethernet data frames of the single Ethernet signal into split frames depending on the number of installed active Digital Subscriber Line (DSL)-ports and the downstream data rates of said active Digital Subscriber Line (DSL)-ports; and
   a tagging unit for tagging the split frames with sequence numbers and with the port numbers of the respective Digital Subscriber Line (DSL)-ports to which the split frames are transmitted by the tagging unit.

3. The modem according to claim 1, wherein the data collection and reorganization unit comprises:
   a sequence number detection unit for detecting the sequence numbers of split frames received by the data collection and reorganization unit from the Digital Subscriber Line (DSL)-ports; and
   a frame assembly unit which assembles the split frames to Ethernet data frames of a single Ethernet signal depending on the detected sequence number and the port numbers of the respective Digital Subscriber Line (DSL)-ports from which the data collection reorganization unit receives the split frames.

4. The modem according to claims 1, comprising a flow and rate control memory for storing the Ethernet data stream of the Ethernet signal assembled by said data collection and reorganization unit, wherein the flow and rate control memory is provided to compensate differences in transmitting rates between said first port and said second port.

5. The modem according to claim 1, comprising a configuration and auto sense unit for sensing the port numbers of all active Digital Subscriber Line (DSL) ports installed in the second port of said modem.

6. The modem according to claim 1, comprising a MII interface which is connected to the physical layer module via a 2-port Media Independent Interface (MII) bridge.

7. The modem according to claim 1, comprising a controller for configuring the MII interface, the data collection and reorganization unit and the data splitter depending on the number of active Digital Subscriber Line (DSL) ports sensed by said configuration and auto sense unit.

8. The modem according to claim 1, wherein the upstream data rate of each Digital Subscriber Line (DSL) signal is equal to the downstream data rate of said Digital Subscriber Line (DSL) signal.

9. The modem according to claim 1, wherein the high data rate of said single Ethernet signal is 100 Mbps.

10. The modem according to claim 1, wherein the maximum number of installed Digital Subscriber Line (DSL)-ports is four.

11. The modem according to claim 1, wherein the telephone line is a twisted pair of copper wires.

12. The modem according to claim 1, wherein the first port is a 100 BaseT port.

13. The modem according to claim 1, wherein the second port is a 100 BaseS port.

14. The modem according to claim 1, wherein each Digital Subscriber Line (DSL)-port measures a maximum data rate for transmission and reception of a Digital Subscriber Line (DSL) signal over the respective telephone line connected to said Digital Subscriber Line (DSL)-port.

15. The modem according to claim 1, wherein each Digital Subscriber Line (DSL)-port comprises a link establishment result register for storing the measured respective maximum data rate of said Digital Subscriber Line (DSL)-port.

16. The modem according to claim 14, wherein the maximum data rates of all installed active Digital Subscriber Line (DSL)-ports are indicated by said Digital Subscriber Line (DSL)-ports to the auto-sense unit via lines and are stored with the corresponding port numbers of the Digital Subscriber Line (DSL)-ports.

17. A point to point facility transport system for the bi-directional transport of an Ethernet signal over N telephone lines connecting a central office facility to a customer premise, comprising:
  N downstream transmission paths for transporting a single Ethernet signal from the central office facility to the customer premise, each downstream transmission path operative to transport a data stream having downstream data rates;
  N upstream transmission paths for transporting a single Ethernet signal from the customer premise to the central office facility, each upstream transmission path operative to transport a data stream having configurable data rate;
  first modem means located at the central office facility and coupled to one end of said N downstream transmission paths and to one end of said N upstream transmission paths;
  second modem means located at the customer premises and coupled to the one end of said N downstream transmission paths and the other end of said N upstream transmission paths;
  wherein said first modem means and said second modem means are operative to transmit to and receive from said N telephone lines data frames encapsulating said Ethernet signal; and
  wherein said first modem means and said second modem means further comprises:
    (a) a first port connected to a physical layer module configured to receive and transmit a single Ethernet signal having a high data rate;
    (b) a data splitter configured to split the received Ethernet signal into a configurable number of downstream Digital Subscriber Line (DSL) signals;
    (c) a second port comprising a configurable number of Digital Subscriber Line (DSL) ports coupled to said data splitter, wherein each Digital Subscriber Line (DSL) port is configured to transmit a separate downstream Digital Subscriber Line (DSL) signal having a configurable downstream data rate,
    wherein each transmitted downstream Digital Subscriber Line (DSL) signal is transmitted via a corresponding telephone line connected to said Digital Subscriber Line (DSL) port,
    wherein each Digital Subscriber Line (DSL) port is further configured to receive a upstream Digital Subscriber Line (DSL) signal having a configurable upstream data rate,
    wherein each received upstream Digital Subscriber Line (DSL) signal is received over said telephone line connected to said Digital Subscriber Line (DSL) port; and
    (d) a data collection and reorganization unit coupled to said Digital Subscriber Line (DSL) ports and configured to assemble said upstream Digital Subscriber Line (DSL) signals into said single Ethernet signal for transmission by said physical layer module.

18. The facility transport system according to claim 17, wherein the transmission paths utilize quadrature amplitude modulation to transport said Ethernet signal between said central office facility to said customer premise.

19. A facility transport system for bi-directional transport of a Ethernet signal over N telephone lines connecting a central office facility to a customer premise, comprising:
  N downstream transmission paths for transporting a single Ethernet signal from the central office facility to the customer premise, each downstream transmission path operative to transport a data stream having a configurable data rate;
  N upstream transmission paths for transporting a single Ethernet signal from the customer premise to the central office facility, each upstream transmission path operative to transport a Digital Subscriber Line (DSL)-signal having a configurable data rate and;
  switch means located at the central office facility and coupled to one end of said N downstream transmission paths and one end of said N upstream transmission paths;
  a network element located at the customer premises and coupled to the other end of said N downstream transmission paths and the other end of said N upstream transmission paths;
  wherein said switch means and said network element are operative to transmit to and to receive from said N telephone lines data frames encapsulating said Ethernet signal, wherein N is a positive integer;
  wherein each switch means and network element comprises at least one modem having:
    (a) a first port connected to a physical layer module configured to receive and transmit a single Ethernet signal;
    (b) a data splitter configured to split the received signal into a configurable number of downstream Digital Subscriber Line (DSL) signals;
    (c) a second port comprising a configurable number of Digital Subscriber Line (DSL) ports coupled to said data splitter, wherein each Digital Subscriber Line (DSL) port is configured to transmit a separate downstream Digital Subscriber Line (DSL) signal having a configurable downstream data rate, wherein each transmitted downstream Digital Subscriber Line (DSL) signal is transmitted via a corresponding telephone line connected to said Digital Subscriber Line (DSL) port,
    wherein each Digital Subscriber Line (DSL) port is further configured to receive a separate upstream Digital Subscriber Line (DSL) signal having a configurable upstream data rate,
    wherein each received upstream Digital Subscriber Line (DSL) signal is received over said telephone line connected to said Digital Subscriber Line (DSL) port; and
    (d) a data collection and reorganization unit coupled to said Digital Subscriber Line (DSL) ports and configured to assemble said upstream Digital Subscriber Line (DSL) signals into a single Ethernet signal for transmission by said physical layer module.

* * * * *